United States Patent
Barbis

(10) Patent No.: US 11,537,486 B2
(45) Date of Patent: *Dec. 27, 2022

(54) VERIFYING INTERCONNECTION BETWEEN MEDIA DEVICES AND METERS USING TOUCH SENSING INTEGRATED CIRCUITS

(71) Applicant: The Nielsen Company (US), LLC, New York, NY (US)

(72) Inventor: Andrej Barbis, Ilirska Bistrica (SI)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/353,293

(22) Filed: Jun. 21, 2021

(65) Prior Publication Data

US 2021/0311849 A1 Oct. 7, 2021

Related U.S. Application Data

(63) Continuation of application No. 16/544,132, filed on Aug. 19, 2019, now Pat. No. 11,042,460, which is a
(Continued)

(51) Int. Cl.
*G06F 11/30* (2006.01)
*G06F 11/07* (2006.01)
*H04H 60/32* (2008.01)

(52) U.S. Cl.
CPC ...... *G06F 11/3051* (2013.01); *G06F 11/0736* (2013.01); *G06F 11/0751* (2013.01); *G06F 11/0772* (2013.01); *H04H 60/32* (2013.01)

(58) Field of Classification Search
CPC ............. G06F 11/0703; G06F 11/0736; G06F 11/0751; G06F 11/0766; G06F 11/0772;
(Continued)

(56) References Cited

U.S. PATENT DOCUMENTS 5,532,732 A 7/1996 Yuen et al.
5,568,610 A 10/1996 Brown
(Continued)

OTHER PUBLICATIONS

Microch IP Technology Inc., "CAP 1293: 3-Channel Capacitive Touch Sensor with Proximity Detection & Signal Guard," Jul. 14, 2015, 63 pages.
(Continued)

*Primary Examiner* — Thomas J. Cleary
(74) *Attorney, Agent, or Firm* — Hanley, Flight & Zimmerman, LLC

(57) ABSTRACT

A disclosed example meter to monitor a media device includes a touch sense circuit including a circuit input and a circuit output, the circuit input to electrically couple with a first power line of the meter and a capacitor, the circuit output to provide a first value based on the capacitor when the first power line of the meter is not electrically coupled with a second power line of the media device, the circuit output to provide a second value different from the first value when the first power line of the meter is electrically coupled with the second power line of the media device. The disclosed example meter also includes at least one processor to detect the first power line of the meter is not electrically coupled with the second power line of the media device when the circuit output of the touch sense circuit provides the first value.

17 Claims, 7 Drawing Sheets

Related U.S. Application Data continuation of application No. 15/371,973, filed on Dec. 7, 2016, now Pat. No. 10,387,284.

(58) Field of Classification Search
CPC ............ G06F 11/3051; G06F 11/3055; G06F 11/3089; G06F 1/3215; G06F 1/3218; G06F 1/3231; G06F 13/4063; G06F 13/4068; G06F 13/409
See application file for complete search history.

(56) References Cited

U.S. PATENT DOCUMENTS

| | | |
|---|---|---|
| 5,659,367 A | 8/1997 | Yuen |
| 6,049,286 A | 4/2000 | Forr |
| 6,457,071 B1 | 9/2002 | Thorland et al. |
| 7,697,072 B2 | 4/2010 | Chao et al. |
| 7,882,514 B2 | 2/2011 | Nielsen et al. |
| 8,677,385 B2 | 3/2014 | Fuhrer |
| 10,387,284 B2 | 8/2019 | Barbis |
| 11,042,460 B2 * | 6/2021 | Barbis ................ G06F 11/0751 |
| 2004/0249991 A1 | 12/2004 | Ali et al. |
| 2009/0083825 A1 | 3/2009 | Miller et al. |
| 2010/0182159 A1 | 7/2010 | Lynch et al. |
| 2011/0093624 A1 | 4/2011 | Crumlin et al. |
| 2012/0299599 A1 | 11/2012 | Naruse et al. |
| 2013/0159560 A1 | 6/2013 | Cave et al. |
| 2013/0234725 A1 | 9/2013 | Enge |
| 2014/0101345 A1 | 4/2014 | Ranta |
| 2016/0323571 A1 | 11/2016 | Nielsen et al. |
| 2017/0026843 A1 | 1/2017 | Lazaravich et al. |
| 2017/0093199 A1 | 3/2017 | Pinciuc et al. |
| 2017/0102424 A1 | 4/2017 | Maalouf et al. |
| 2017/0127202 A1 | 5/2017 | Kim et al. |
| 2018/0160111 A1 | 6/2018 | Barbis |
| 2019/0370140 A1 | 12/2019 | Barbis |

OTHER PUBLICATIONS

Freescale Semiconductor, Inc., "MPR031/MPR032: Proximity Capacitive Touch Sensor Controller," Rev 7, Jul. 2012, 34 pages.

United States Patent and Trademark Office, "Notice of Allowance," mailed in connection with U.S. Appl. No. 15/371,973, dated Apr. 4, 2019, 12 pages.

United States Patent and Trademark Office, "Non-final Office Action," mailed in connection with U.S. Appl. No. 15/371,973, dated Dec. 12, 2018, 14 pages.

United States Patent and Trademark Office, "Notice of Allowance," mailed in connection with U.S. Appl. No. 16/544,132, dated Feb. 18, 2021, 8 pages.

United States Patent and Trademark Office, "Non-final Office Action," mailed in connection with U.S. Appl. No. 16/544,132, dated Oct. 27, 2020, 19 pages.

* cited by examiner

VERIFYING INTERCONNECTION BETWEEN MEDIA DEVICES AND METERS USING TOUCH SENSING INTEGRATED CIRCUITS

RELATED APPLICATION(S)

This patent arises from a continuation of U.S. patent application Ser. No. 16/544,132 (now U.S. Pat. No. 11,042, 460), which is entitled "VERIFYING INTERCONNECTION BETWEEN MEDIA DEVICES AND METERS USING TOUCH SENSING INTEGRATED CIRCUITS," and which was filed on Aug. 19, 2019, which is a continuation of U.S. patent application Ser. No. 15/371,973 (now U.S. Pat. No. 10,387,284), which is entitled "VERIFYING INTERCONNECTION BETWEEN MEDIA DEVICES AND METERS USING TOUCH SENSING INTEGRATED CIRCUITS," and which was filed on Dec. 7, 2016. Priority to U.S. patent application Ser. No. 16/544,132 and U.S. patent application Ser. No. 15/371,973 is hereby expressly claimed. U.S. patent application Ser. No. 16/544, 132 and U.S. patent application Ser. No. 15/371,973 are hereby incorporated by reference in their respective entireties.

FIELD OF THE DISCLOSURE

This disclosure relates generally to media device monitoring and, more particularly, to verifying interconnection between media devices and meters using touch sensing integrated circuits.

BACKGROUND

Audience measurement systems typically include one or more site meters to monitor the media presented by one or more media devices located at a monitored site. In some arrangements, the monitored media device may receive media from one or more media sources, such as, but not limited to, a set-top box (STB), a digital versatile disk (DVD) player, a Blu-ray Disk™ player, a gaming console, a computer, etc., which are powered independently from the monitored media device. Accordingly, there is the possibility that, although a media source at the monitored site is powered on and providing media to the monitored media device, the monitored media device may be powered off and, thus, not actively presenting the media provided by the media source. Therefore, to enable accurate crediting of media exposure at the monitored site, some site meters further monitor the operating state of the monitored media device to determine whether the media device is powered off and not capable of presenting media, or powered on and capable of presenting media.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
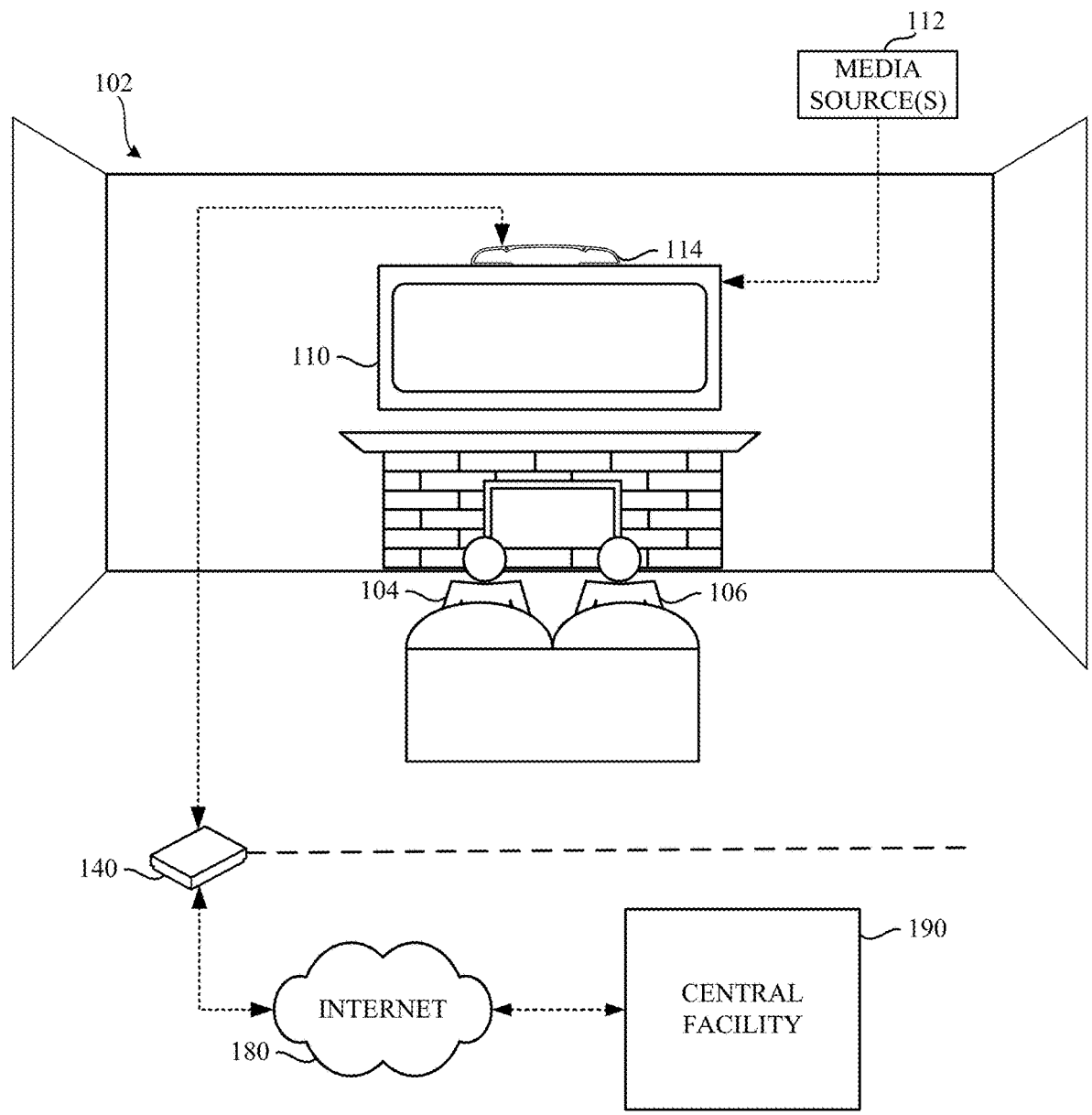
FIG. 1 is a block diagram of an example system including an example device meter constructed to verify interconnection between a media device and the device meter with an example touch sensing integrated circuit in accordance with the teachings of this disclosure.

Example methods, apparatus, systems and articles of manufacture (e.g., physical storage media) to verify interconnection between media devices and device meters with touch sensing integrated circuits are disclosed herein. Example methods disclosed herein include accessing an output of a touch sensing integrated circuit associated with a meter, with the touch sensing integrated circuit to electrically couple with an interface of a media device monitored by the meter. For example, the interface of the media device can be a powered interface, such as, but not limited to, a universal serial bus (USB) port, a high-definition multimedia interface (HDMI) port, etc. Example methods disclosed herein also include determining the meter is coupled to the media device via the interface in response to the output of the touch sensing integrated circuit providing an error indication.

Some disclosed example methods further include determining the meter is uncoupled from the media device in response to the output of the touch sensing integrated circuit not providing the error indication. For example, in some such disclosed examples the touch sensing integrated circuit is also electrically coupled to a reference capacitor having a reference capacitance to cause the output of the touch sensing integrated circuit to not provide the error indication when the meter is uncoupled from the media device. In some such disclosed examples, the reference capacitance is in the range of 100 picofarads (pF) to 1 nanofarads (nF).

Additionally or alternatively, in some disclosed example methods, the interface with which the touch sensing integrated circuit is to be coupled is a powered interface of the media device. Accordingly, some such disclosed example methods can further include detecting whether power is present on the power line, and determining an operating state of the media device based on whether power is detected on the power line and whether the meter is determined to be coupled to the media device via the powered interface. For example, some such disclosed example methods include determining the operating state of the media device to be an on state in response to detecting power on the power line, determining the operating state of the media device to be an off state in response to not detecting power on the power line and determining the meter is coupled to the media device via the powered interface, and determining the operating state of the media device to be indeterminate in response to not detecting power on the power line and determining the meter is uncoupled from the media device. Additionally or alternatively, some such disclosed example methods include uncoupling the touch sensing integrated circuit from the power line of the powered interface in response to detecting power on the power line, and coupling the touch sensing integrated circuit to the power line in response to not detecting power on the power line.

These and other example methods, apparatus, systems and articles of manufacture (e.g., physical storage media) to verify interconnection between media devices and device meters with touch sensing integrated circuits are disclosed in further detail below.

As noted above, to enable accurate crediting of media exposure at the monitored site, some site meters monitor the operating state of a monitored media device to determine whether the media device is powered off and not capable of presenting media, or powered on and capable of presenting media. For example, some prior site meters monitor the operating state of a media device by detecting whether power, such as a voltage or current, is being provided by a physical, powered interface of the media device, such as a universal serial bus (USB) port, a high-definition multimedia interface (HDMI) port, etc. For example, such prior meters may be coupled to the USB port of the media device and sense whether power is present on the USB power line. If USB power is detected, the prior site meters determine the media device is powered on. Conversely, if USB power is not detected, the prior site meters may determine the media device is powered off. However, such prior site meters may be unable to distinguish between USB power not being detected because the monitored media device is powered off, or because the site meter was physically decoupled from the USB port of the media device.

The present disclosure provides example technical solutions to the technical problem of determining whether a site meter, which is designed to be coupled to a powered interface (e.g., USB port, HDMI port, etc.) of a monitored media device, is not detecting power from the monitored media device because the monitored media device is powered off, or because the site meter has been physically decoupled from the powered interface of the monitored media device. Some such disclosed example technical solutions are provided for a site meter by an example enhanced operating state detector including an example device interconnection verifier implemented in accordance with the teachings of this disclosure to verify interconnection between media devices and meters using touch sensing integrated circuits. For example, such a disclosed example enhanced operating state detector is able to not only detect whether power is present or absent on the powered interface (e.g., USB port, HDMI port, etc.) of the monitored media device, but is also able to detect whether the site meter has been physically decoupled from the powered interface of the media device. In some examples disclosed herein, the enhanced operating state detector includes an example power detector (e.g., a voltage detector, a current detector, etc.) capable of being coupled to the power pins of a powered interface (e.g., USB port, HDMI port, etc.) of the monitored media device to detect whether power is being provided by the media device. Some such disclosed example enhanced operating state detectors also include an example device interconnection verifier with an example touch sensing integrated circuit (TSI or TSIC) capable of being coupled to the power pins of the powered interface (e.g., USB port, HDMI port, etc.) of the monitored media device to sense capacitance across the power pins, which the example device interconnection verifier uses to determine whether the site meter has been unplugged from the media device.

For example, if power is detected on the powered interface (e.g., USB port, HDMI port, etc.) of the monitored media device, the media device is determined to be powered on (e.g., capacitance can be ignored). However, in some such examples, if power is not detected on the powered interface, then the media device is determined to be powered off if the TSI returns an error indication (such as an out-of-range indication, a failure indication, etc., or any other indication of an error condition), which would be caused by the media device's bulk capacitance exceeding the capacitance range supported by the TSI. Otherwise, if little to no bulk capacitance is present and the TSI does not return any error indication (e.g., because the sensed capacitance was in the capacitance range supported by the TSI), the site meter is determined to be uncoupled from (e.g., unplugged from) the powered interface (e.g., USB port, HDMI port, etc.) of the monitored media device.

Note, example technical solutions disclosed herein, which verify interconnection between media devices and meters using TSIs, are unlike prior capacitance sensing techniques that measure the capacitance across USB power lines of a host device and compare the measured capacitance to a threshold to determine whether an external device has been decoupled from the host device. Such prior techniques require calibration of the detection threshold because bulk capacitance can vary among host devices. In contrast, example technical solution disclosed herein to verify interconnection between media devices and meters utilize a TSI to indirectly measure whether the bulk capacitance of the media device is present on the power line of, for example, a USB port of the media device, and/or some other powered interface (e.g., HDMI port) of the media device. For example, a TSI is generally configured to measure a low capacitance, such as from 10 picofarads to 1.5 nanofarads, induced by a human finger touching a sensor (e.g., a touchscreen). However, the bulk capacitance, CHOST, of a monitored media device typically will be orders of magnitude larger than the capacitance range supported by the TSI. Thus, if a site meter includes an example device interconnection verifier (or an example enhanced operating state detectors with an example device interconnection verifier) implemented with a TSI in accordance with the teachings of this disclosure, when the site meter is connected to the monitored media device, the media device's bulk capacitance, CHOST, will be so large as to cause a register (e.g., such as a status register) of the TSI to output a value providing an error indication (such as an out-of-range indication, a failure indication, etc., or any other indication of an error condition). Without involving any comparison to a threshold, such an error indication register value can indicate the site meter is interconnected with the monitored media device. However, if the site meter is not connected with (e.g., is unplugged from) the monitored media device, the TSI register will not return the error indication because the TSI will sense a valid capacitance, which may be ensured by also coupling the TSI with a reference capacitor, CREF, having a capacitance in the range supported by the TSI. Thus, any valid output from the TSI, or the lack of a TSI output (e.g., register) providing an error indication, can indicate the site meter has been uncoupled from (e.g., is not plugged into) the monitored media device.

FIG. 1 is an illustration of an example audience measurement system constructed to include functionality to verify interconnection between media devices and device meters with touch sensing integrated circuits in accordance with the teachings of this disclosure. In the illustrated example of FIG. 1, an example media presentation environment 102 includes example panelists 104, 106, an example media device 110 (also referred to as a media presentation device) that receives media from an example media source 112, and an example meter 114. The example meter 114 identifies the media presented by the example media device 110 and reports media monitoring information to an example central facility 190 of an example audience measurement entity via an example gateway 140 and an example network 180. In some examples, the meter 114 is referred to as a site meter, a device meter, an audience measurement device, etc. As disclosed in further detail below, the meter 114 is able to verify interconnection between the media device 110 and the meter 114 with an example touch sensing integrated circuit in accordance with the teachings of this disclosure.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia device capable of presenting media audibly and/or visually. In some examples, the media device 110 (e.g., a television) may communicate audio to another media device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media device 110 (e.g., near a television set). In some examples, more complex installation activities may be performed such as, for example, affixing the meter 114 to the media device 110, electronically connecting the meter 114 to the media device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media device 110 and/or other media device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 114 of the illustrated example of FIG. 1 monitors for watermarks (sometimes referred to as codes) included in the presented media and/or generates signatures (sometimes referred to as fingerprints) representative of the presented media Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Depending on the type(s) of metering the meter 114 is to perform, the meter 114 can be physically coupled to the media device 110 or may be configured to capture audio emitted externally by the media device 110 (e.g., free field audio) such that direct physical coupling to the media device 110 is not required. For example, the meter 114 of the illustrated example may employ non-invasive monitoring not involving any physical connection to the media device 110 (e.g., via Bluetooth® connection, WIFI® connection, acoustic sensing via one or more microphone(s) and/or other acoustic sensor(s), etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 114 of the illustrated example senses audio (e.g., acoustic signals or ambient audio) output (e.g., emitted) by the media device 110. For example, the meter 114 processes the signals obtained from the media device 110 to detect media and/or source identifying signals (e.g., audio watermarks, audio signatures) embedded in and/or generated from portion(s) (e.g., audio portions) of the media presented by the media device 110. To, for example, sense ambient audio output by the media device 110, the meter 114 of the illustrated example includes an example acoustic sensor (e.g., a microphone). In some examples, the meter 114 may process audio signals obtained from the media device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media device 110) to communicate with the network 180 (e.g., the Internet.)

In some examples, the example gateway 140 facilitates delivery of media from the media source(s) 112 to the media device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media device 110. However, the meter 114 may be affixed to the media device in any other orientation, such as, for example, on a side of the media device 110, on the bottom of the media device 110, and/or may not be affixed to the media device 110. For example, the meter 114 may be placed in a location near the media device 110.

Figure 2:
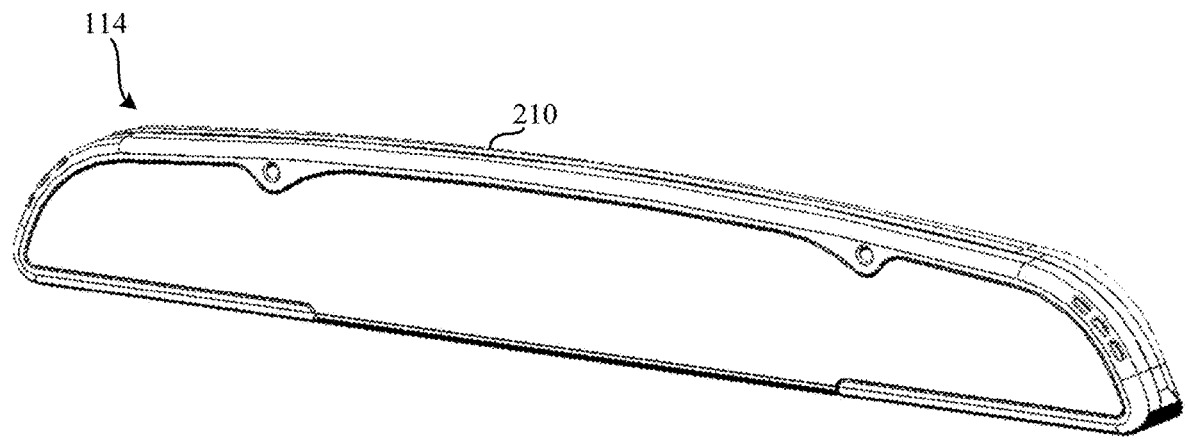
FIG. 2 is an example front view of the example meter of FIG. 1.

FIG. 2 is an example front view of the example meter 114 of FIG. 1. In the illustrated example of FIG. 2, the example meter 114 includes an example housing 210. In examples disclosed herein, the housing 210 is to be affixed to the media device 110. For example, the housing may be affixed to a top of the media device 110, may be affixed to a bottom of the media device 110, may be affixed to a side of the media device 110, etc. In some examples, the housing 210 of the meter 114 is not affixed to the media device 110. For example, the housing 210 may be placed in any other location within the media presentation environment 102 such that audio may be received by the meter 114.

Figure 3:
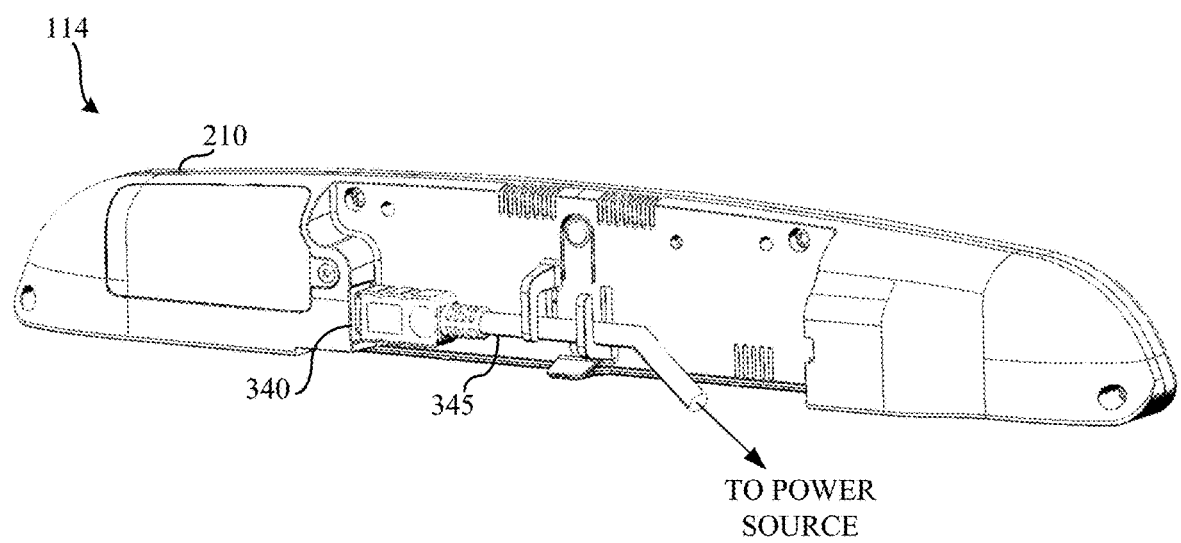
FIG. 3 is an example rear view of the example meter of FIG. 1.

FIG. 3 is an example rear view of the example meter 114 of FIG. 1. In the illustrated example of FIG. 3, the example housing 210 includes an example USB port 340. In the illustrated example of FIG. 3, the USB port 340 enables a USB cable 345 to connect the example meter 114 to an external power source (e.g., a power source provided by the media device 110). However, any other type(s) and/or number(s) of ports, cables, power source(s), etc. may additionally or alternatively be used.

Figure 4:
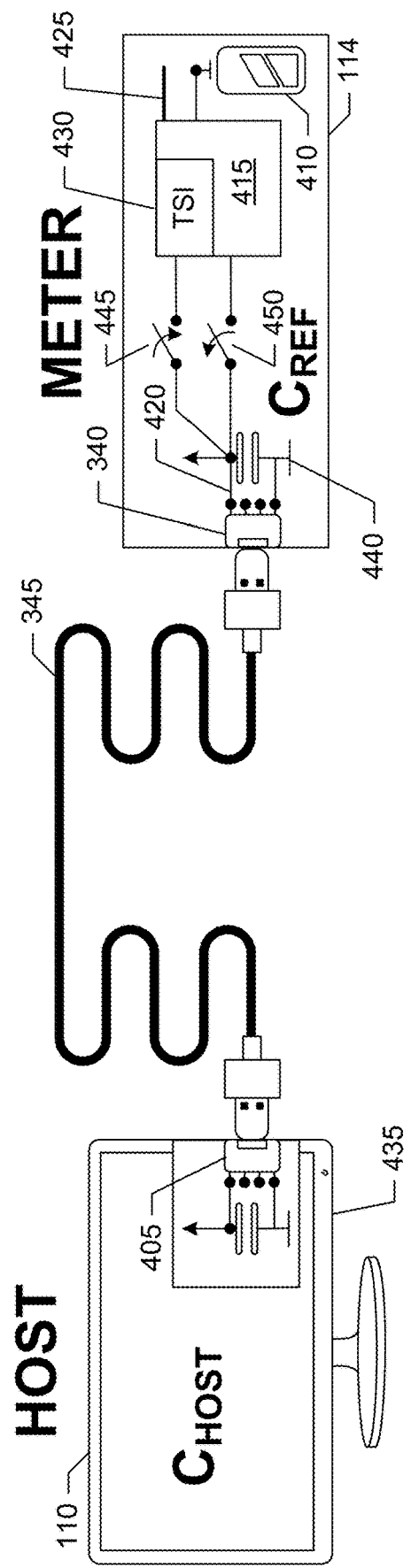
FIG. 4 is a block diagram of an example implementation of the meter of FIG. 1, which includes an example operating state detector constructed in accordance with the teachings of this disclosure.

FIG. 4 is a block diagram of an example implementation of the meter 114 of FIGS. 1-3, and further illustrates an example of interconnecting the meter 114 with the example media device 110. In the illustrated example of FIG. 4, the meter 114 receives power from an external source (e.g., the example media device 110, a charger plugged into a wall outlet, etc.) via the example USB port 340 when the example USB cable 345 is coupled to (plugged into) the external source, such as the media device 110, as shown. For example, the media device 110 of the illustrated example has an example USB port 405 that provides electrical power to, for example, an external device, such as the meter 114. In some examples, the media device 110 may provide power to an external device via a different type of powered interface accessible via any type of port such as, for example, a High Definition Media Interface (HDMI) port, an Ethernet port, etc.

In the illustrated example of FIG. 4, the meter 114 further utilizes the USB interface with the media device 110 provided by the USB cable 345 and USB ports 340 and 405 280 to perform media monitoring associated with the media device 110. For example, the meter uses this USB interface to determine whether the media device 110 is powered on, determine which input is being presented via the media device 110, determine which speakers are being used by the media device 110, etc. In some examples, the connection is an HDMI connection, and the meter 114 communicates with the media device 110 using an HDMI Consumer Electronics Control (CEC) protocol.

The example meter 114 of FIG. 4 also includes an example battery 410. The example battery 410 of the illustrated example of FIG. 4 stores power for use by the meter 114. The example battery 410 enables operation of the meter 114 when power is not being supplied to the meter 114 via the USB port 340. In the illustrated example of FIG. 4, the example battery 410 is implemented using a lithium-ion battery. However, any other type of battery may additionally or alternatively be used. In the illustrated example of FIG. 4, the example battery 410 is rechargeable. As such, the example battery 410 may be recharged while the meter 114 receives power via the USB port 340 (e.g., while the media device 110 is powered on), to facilitate operation of the meter 114 when the meter 114 is not receiving power via the USB port 340 (e.g., while the media device 110 is powered off). However, in some examples, the example battery 410 may be non-rechargeable.

The example meter 114 of the illustrated example of FIG. 4 further includes an example operating state detector 415 to determine an operating state of the example media device 110. In the illustrated example of FIG. 4, the operating state detector 415 is electrically coupled to an example power line 420 provided by a power pin of the USB port 340. The operating state detector 415 of the illustrated example determines whether the media device 110 is powered on (or, in other words, on, active, activated, etc.) or powered off (or, in other words, off, inactive, deactivated, etc.) by detecting whether power of being provided by the media device 110 via the USB interface to the power line 420. The operating state detector 415 of the illustrated example outputs the determined operating state of the media device 110 via an example output 425. For example, if the operating state detector 415 detects power (e.g., a voltage, a current, etc.) on the power line 420, the operating state detector 415 determines the media device 110 is powered on and outputs this powered on determination via an appropriate indication, value, etc., via the example output 425. However, if the operating state detector 415 does not detect power on the power line 420, this lack of power could be caused by the media device 110 being powered off, or because the meter 114 has been physically decoupled from the USB port 405 of the media device 110.

To distinguish between whether the power is not detected on the power line 420 because the media device 110 is powered off or because the meter 114 has been physically decoupled from the USB port 405 of the media device 110, the operating state detector 415 of the illustrated example is enhanced to verify the interconnection between the meter 114 and the media device 110 with an example touch sensing integrated circuit (TSI) 430 in accordance with the teachings of this disclosure. For example, the TSI 430 is electrically coupled to the power pins of the USB port 340 of the meter 114 and, thus, is electrically coupled to the power line 420. The TSI 430 of the illustrated example senses the capacitance associated with the power line 420 (e.g., across the power pins of the USB port 340), which the example enhanced operating state detector 415 uses to determine whether the meter 114 has been unplugged from the media device 110.

For example, to verify interconnection between the example meter 114 and the example media device 110, the enhanced operating state detector 415 of the illustrated example meter 114 utilizes the TSI 430 to indirectly measure whether the bulk capacitance of the media device 110 is present on the power line 420 the USB port 340 of the meter 114, which is electrically coupled to the USB port 405 of the media device 110 via the USB cable 345. For example, a TSI, such as the example TSI 430, is generally configured to measure a low capacitance, such as from 100 pF to 1 nF, induced by a human finger touching a sensor (e.g., a touchscreen). However, the bulk capacitance, CHOST, of the monitored media device 110 (which is indicated by reference numeral 435 if FIG. 4) typically will be orders of magnitude larger than the capacitance range supported by the TSI 430. Thus, when the site meter 114 of the illustrated example is connected to the monitored media device 110, the media device's bulk capacitance 435, CHOST, will be so large as to cause an output of the TSI 430, such as a register (e.g., a status register), to output a value providing an error indication (such as an out-of-range indication, a failure indication, etc., or any other indication of an error condition). Without involving any comparison to a threshold, such an error indication can indicate the site meter 114 is interconnected with the monitored media device 110. However, if the site meter 114 of the illustrated example is not connected with (e.g., is unplugged from) the monitored media device 110, the TSI 430 will not return the error indication because the TSI 430 will sense a valid capacitance, which may be ensured by also coupling the TSI 430 with an example reference capacitor 440, CREF, as shown. The reference capacitor 440, CREF, of the illustrated example has a capacitance in the range supported by the TSI 430. For example, the reference capacitor 440, CREF, can have a capacitance in the range of 100 pF to 1 nF, or some other range, as appropriate. Thus, any valid output from the TSI 430, or the lack of an output/register of the TSO 430 providing an error indication, can indicate the site meter 114 has been uncoupled from (e.g., is not plugged into) the monitored media device 110.

Thus, in the illustrated example of FIG. 4, if the enhanced operating state detector 415 detects power on the power line 420 of the media device 110, the operating state detector 415 determines the media device 110 is powered on and, thus, any capacitance sensed by the TSI 430 can be ignored. However, if the enhanced operating state detector 415 does not detect power on the powered power line 420, then the operating state detector 415 determines whether an output of the TSI 430 has returned an error indication. If the TSI 430 returns an error indication (such as an out-of-range indication, a failure indication, etc., or any other indication of an error condition), which would be caused by the media device's bulk capacitance 435 exceeding the capacitance range supported by the TSI 430, the enhanced operating state detector 415 determines the meter 114 is coupled with the media device 110 and the lack of power is due to the media device 110 being powered off. The example enhanced operating state detector 415 then outputs this powered off determination via an appropriate indication, value, etc., via the example output 425. However, if the TSI 430 does not return any error indication (e.g., because the media device's bulk capacitance 435 is not present and the sensed capacitance was in the capacitance range supported by the TSI 430), the example enhanced operating state detector 415 determines that the site meter 114 is uncoupled from (e.g., unplugged from) the powered interface (e.g., USB port 405) of the monitored media device 110. Thus, in such an example, the enhanced operating state detector 415 can outputs an appropriate indication, value, etc., via the example output 425 to indicate the operating state of the media device 110 is indeterminate.

In some examples, the enhanced operating state detector 415 controls example switches 445-450 included in the example meter 114 to configure whether the example battery 410 of the example TSI 430 is electrically coupled with the power line 420 of the USB port 340 (and, thus, is electrically coupled with the powered interface of the media device 110). In some such examples, in response to detecting power (e.g., a voltage, a current, etc.) on the power line 420 of the meter's USB port 340, the enhanced operating state detector 415 controls the example switch 450 to electrically couple the example battery 410 to the power line 420 to enable charging of the battery 410 and powering of the meter 114 from the power line 420. In some such examples, in response to detecting power (e.g., a voltage, a current, etc.) on the power line 420 of the meter's USB port 340, the enhanced operating state detector 415 also controls the example switch 445 to electrically uncouple (or, in other words, decouple) the example TSI 430 from the power line 420 (e.g., because the output of the TSI 430 is not needed when power is detected on the power line 420, and to protect the TSI 430). However, in some such examples, in response to not detecting power (e.g., a voltage, a current, etc.) on the power line 420 of the meter's USB port 340, the enhanced operating state detector 415 controls the example switch 450 to electrically uncouple (or, in other words, decouple) the example battery 410 (and the meter 114) from the power line 420, which causes the battery 410 to power the meter 114, including the operating state detector 415. In some such examples, in response to not detecting power (e.g., a voltage, a current, etc.) on the power line 420 of the meter's USB port 340, the enhanced operating state detector 415 also controls the example switch 445 to electrically couple the example TSI 430 to the power line 420, which allows the operating state detector 415 to use the output of the TSI 430 to verify whether the meter 114 is coupled to the 110, as described above.

Figure 5:
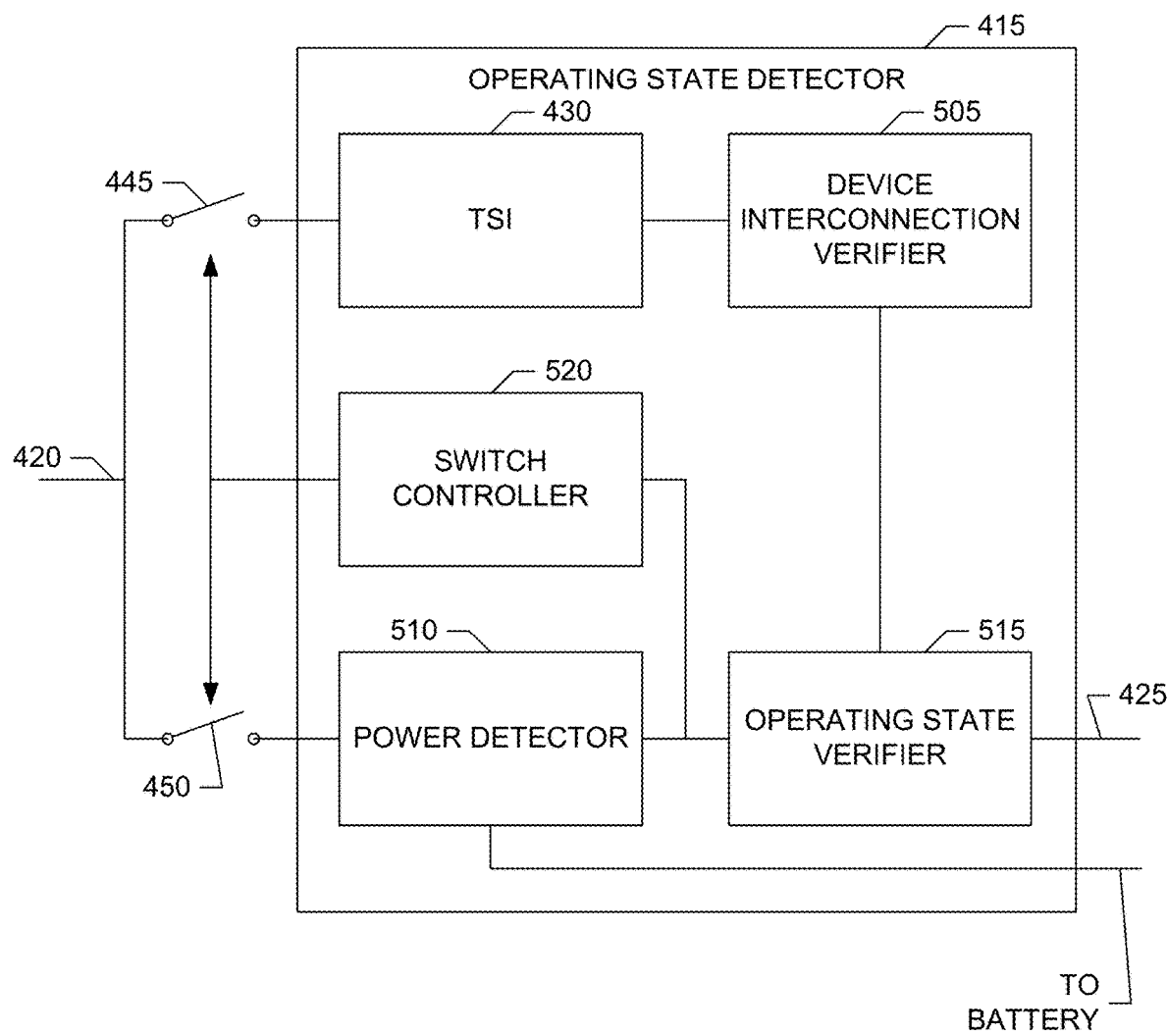
FIG. 5 is a block diagram of an example implementation of the example operating state detector of FIG. 4, which includes an example device interconnection verifier constructed in accordance with the teachings of this disclosure.

A block diagram of an example implementation of the enhanced operating state detector 415 of FIG. 4 is illustrated in FIG. 5. The example enhanced operating state detector 415 of FIG. 5 includes the example TSI 430 of FIG. 4. The example TSI 430 can be implemented by any TSI or similar device, such as, for example, the CAP1293 TSI from Microchip Technology Inc.®, the MPR031EPR2 TSI from Freescale Semiconductor Inc.®, etc. As described above, the TSI 430 includes an output (e.g., a register) that provides an error indication (such as an out-of-range indication, a failure indication, etc., or any other indication of an error condition) when the capacitance sensed by the TSI 430 exceeds its supported capacitance range. As described above, the TSI 430 is electrically coupled via the example switch 445 to the example power line 420 of the example USB port 340 of the example meter 114, which is to electrically couple with a powered interface provided by a port (e.g., the example USB port 405, an HDMI port, etc.) of the monitored media device 110.

The example enhanced operating state detector 415 of FIG. 5 also includes an example device interconnection verifier 505 to process an output of the TSI 430 to determine whether the meter 114 is coupled to the media device 110. For example, the device interconnection verifier 505 determines the meter 114 is coupled to the media device 110 via the powered interface associated with the power line 420 in response to the output of the TSI 430 providing the error indication (e.g., which is due to the presence of the bulk capacitance 435 of the media device 110 on the interface associated with the power line 420). However, in the illustrated example, the device interconnection verifier 505 determines the meter 114 is uncoupled from the media device 110 in response to the output of the TSI 430 not providing the error indication (e.g., which is due to the bulk capacitance 435 of the media device 110 not being present on the interface associated with power line 420).

In the illustrated example of FIG. 5, the enhanced operating state detector 415 also includes an example power detector 510 to detect whether power (e.g., voltage, current, etc.) is present on the example power line 420 associated with the powered interface provided by the media device 110. In some examples, the power detector 510 of FIG. 5 is implemented by a voltage comparator or similar circuit to detect whether voltage exceeding a voltage threshold (e.g., 5 volts, 3.3 volts, 1.5 volts, or any other appropriate value) is present on the power line 420. In such examples, the power detector 510 determines power is present on the power line 420 when the voltage comparator detects a voltage on the power line 420 that satisfies (e.g., meets or exceeds) the voltage threshold, and determines power is not present when the voltage on the power line 420 does not satisfy the voltage threshold. Additionally or alternatively, in some examples, the power detector 510 of FIG. 5 is implemented by a current comparator or similar circuit to detect whether current exceeding a current threshold (e.g., 10 milliamps, 50 milliamps, 100 milliamps, or any other appropriate value) is present on the power line 420. In such examples, the power detector 510 determines power is present on the power line 420 when the current comparator detects a current on the power line 420 that satisfies (e.g., meets or exceeds) the current threshold, and determines power is not present when the current on the power line 420 does not satisfy the current threshold.

The example enhanced operating state detector 415 of FIG. 5 further includes an example operating state verifier 515 to determine an operating state of the media device 110 based on whether the example power detector 510 detects power on the example power line 420 associated with the powered interface provided by the media device 110, and whether the example device interconnection verifier 505 determines the meter 114 is coupled to the media device 110 via the powered interface associated with the power line 420. For example, the operating state verifier 515 determines the operating state of the media device 110 to be a powered on state in response to the power detector 510 detecting power on the power line 420. Conversely, the operating state verifier 515 of the illustrated example determines the operating state of the media device 110 to be a powered off state in response to the power detector 510 not detecting power on the power line 420 and the device interconnection verifier 505 determining, as described above, that the meter 114 is coupled to the media device 110 via the powered interface associated with the power line 420. However, the operating state verifier 515 of the illustrated example determines the operating state of the media device 110 to be indeterminate in response to the power detector 510 not detecting power on the power line 420 and the device interconnection verifier 505 determining, as described above, that the meter 114 is uncoupled from the media device 110. The example operating state verifier 515 of FIG. 5 then outputs a value, message, indication, etc., representing the determined operating state of the media device 110 via the example output 425.

In the illustrated example of FIG. 5, the enhanced operating state detector 415 includes an example switch controller 520 to control an example switch 445, which is configured to selectively couple the TSI 430 to the power line 420 of the powered interface provided by the media device 110, or uncouple the TSI 430 from the power line 420 of the powered interface. For example, the switch controller 520 controls the switch 445 to couple the TSI 430 to the power line 420 in response to the power detector 510 not detecting power on the power line 420. However, in the illustrated example of FIG. 5, the switch controller 520 controls the switch 445 uncouple the TSI 430 from the power line 420 in response to the power detector 510 detecting power on the power line 420.

Additionally or alternatively, in some examples, the switch controller 520 is to control an example switch 450, which is configured to selectively couple the example battery 410 to the power line 420 of the powered interface provided by the media device 110, or uncouple the battery 410 from the power line 420 of the powered interface. For example, the switch controller 520 controls the switch 450 to couple the battery 410 to the power line 420 in response to the power detector 510 detecting power on the power line 420, which causes the power line 420 to power the meter 114 and charge the battery 410. However, in the illustrated example of FIG. 5, the switch controller 520 controls the switch 450 uncouple the battery 410 (and the meter 114) from the power line 420 in response to the power detector 510 detecting power on the power line 420, which causes the battery 410 to power the meter 114.

While an example manner of implementing the example enhanced operating state detector 415 of FIG. 4 is illustrated in FIG. 5, one or more of the elements, processes and/or devices illustrated in FIG. 5 may be combined, divided, re-arranged, omitted, eliminated and/or implemented in any other way. Further, the example TSI 430, the example switches 445-450, the example device interconnection verifier 505, the example power detector 510, the example operating state verifier 515, the example switch controller 520 and/or, more generally, the example enhanced operating state detector 415 of FIG. 5 may be implemented by hardware, software, firmware and/or any combination of hardware, software and/or firmware. Thus, for example, any of the example TSI 430, the example switches 445-450, the example device interconnection verifier 505, the example power detector 510, the example operating state verifier 515, the example switch controller 520 and/or, more generally, the example enhanced operating state detector 415 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example enhanced operating state detector 415, the example TSI 430, the example switches 445-450, the example device inter- connection verifier 505, the example power detector 510, the example operating state verifier 515 and/or the example switch controller 520 is/are hereby expressly defined to include a tangible computer readable storage device or storage disk such as a memory, a digital versatile disk (DVD), a compact disk (CD), a Blu-ray disk, etc. storing the software and/or firmware. Further still, the example enhanced operating state detector 415 may include one or more elements, processes and/or devices in addition to, or instead of, those illustrated in FIG. 5, and/or may include more than one of any or all of the illustrated elements, processes and devices.

Figure 6:
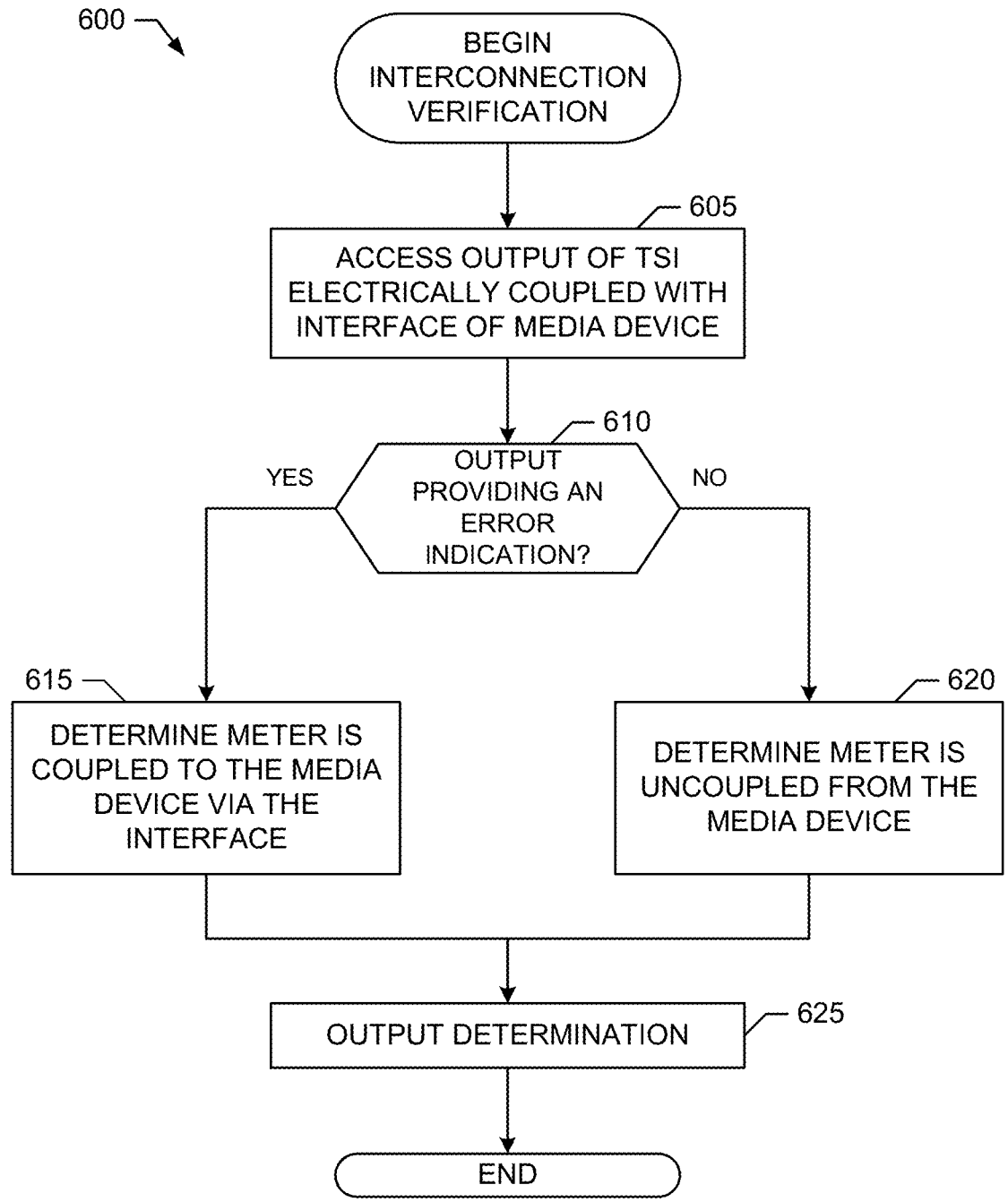
FIG. 6 is a flowchart representative of example machine readable instructions that may be executed to implement the example device interconnection verifier of FIG. 5.
Figure 7:
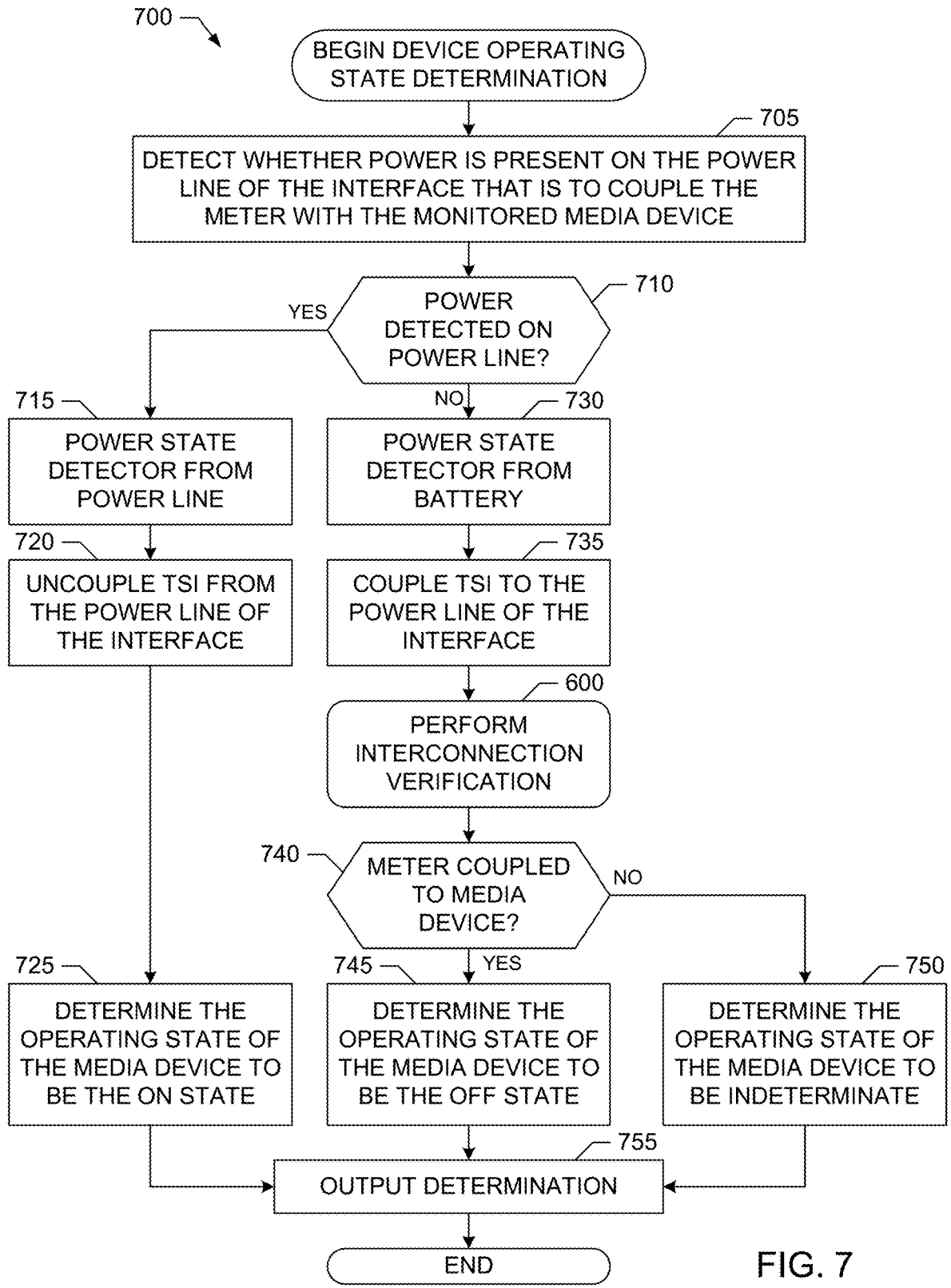
FIG. 7 is a flowchart representative of example machine readable instructions that may be executed to implement the example operating state detector of FIG. 4.

Flowcharts representative of example machine readable instructions for implementing the example enhanced operating state detector 415, the example TSI 430, the example switches 445-450, the example device interconnection verifier 505, the example power detector 510, the example operating state verifier 515 and/or the example switch controller 520 are shown in FIGS. 6-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-7, many other methods of implementing the example enhanced operating state detector 415, the example TSI 430, the example switches 445-450, the example device interconnection verifier 505, the example power detector 510, the example operating state verifier 515 and/or the example switch controller 520 may alternatively be used. For example, with reference to the flowcharts illustrated in FIGS. 6-7, the order of execution of the blocks may be changed, and/or some of the blocks described may be changed, eliminated, combined and/or subdivided into multiple blocks.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 600 that may be executed to implement the example device interconnection verifier 505 of the example enhanced operating state detector 415 of FIG. 5 is illustrated in FIG. 6. For convenience, and without loss of generality, execution of the example program 600 is described from the context of the example enhanced operating state detector 415 being included in the example meter 114 of FIGS. 1-4. With reference to the preceding figures and associated written descriptions, execution of the example program 600 begins at block 605 at which the example device interconnection verifier 505 accesses an output of the example TSI 430, which is electrically coupled with a powered interface of the media device 110 via the example power line 420. At block 610, the device interconnection verifier 505 determines whether the output of the TSI 430 is providing an error indication. If the output of the TSI 430 is providing the error indication (block 610), then at block 615, the device interconnection verifier 505 determines, as described above, that the meter 114 is coupled to the media device 110 via the powered interface associated with the power line 420. However, if the output of the TSI 430 is not providing the error indication (block 610), then at block 620, the device interconnection verifier 505 determines, as described above, that the meter 114 is uncoupled from the media device 110 via the powered interface associated with the power line 420. At block 625, the device interconnection verifier 505 outputs (e.g., for use by the example operating state verifier 515, as described above) its determination as to whether the meter 114 is coupled to the media device 110. Execution of the example program 600 then ends.

An example program 700 that may be executed to implement the example enhanced operating state detector 415 of FIGS. 4-5 is illustrated in FIG. 7. For convenience, and without loss of generality, execution of the example program 700 is described from the context of the example enhanced operating state detector 415 being included in the example meter 114 of FIGS. 1-4. With reference to the preceding figures and associated written descriptions, execution of the example program 700 begins at block 705 at which the example power detector 510 of the enhanced operating state detector 415 detects, as described above, whether power is present on the example power line 420 of the powered interface that is to couple the meter 114 to the media device 110. If power is detected on the power line 420 (block 710), then at block 715, the example switch controller 520 of the enhanced operating state detector 415 controls the example switch 450, as described above, to cause the meter 114 (and, thus, the operating state detector 415) to be powered by the power line 420. At block 720, the switch controller 520 controls the example switch 445 to uncouple the example TSI 430 from the power line 420, as described above. At block 725, the example operating state verifier 515 of the enhanced operating state detector 415 determines the operating state of the media device 110 to be the powered-on state, as described above.

However, if power is not detected on the power line 420 (block 710), then at block 730, the switch controller 520 controls the switch 450, as described above, to cause the meter 114 (and, thus, the operating state detector 415) to be powered by the example battery 410. At block 735, the switch controller 520 controls the switch 445 to couple the example TSI 430 to the power line 420, as described above. Then, the device interconnection verifier 505 of the enhanced operating state detector 415 executes the example program 600 of FIG. 6 to process an output of the TSI 430 to determine, as described above, whether the meter 114 is coupled to the media device 110 via the powered interface associated with the power line 420. If the device interconnection verifier 505 determines the meter 114 is coupled to the media device 110, at block 745, the operating state verifier 515 determines the operating state of the media device 110 to be the powered-off state, as described above. However, if the device interconnection verifier 505 determines the meter 114 is uncoupled from the media device 110, at block 755, the operating state verifier 515 determines the operating state of the media device 110 to be indeterminate, as described above. After making its determination at block 725, block 745 or block 750, at block 755, the operating state verifier 515 outputs, as described above, a value, message, indication, etc., representing the determined operating state of the media device 110 via the example output 425. Execution of the example program 700 then ends.

Figure 8:
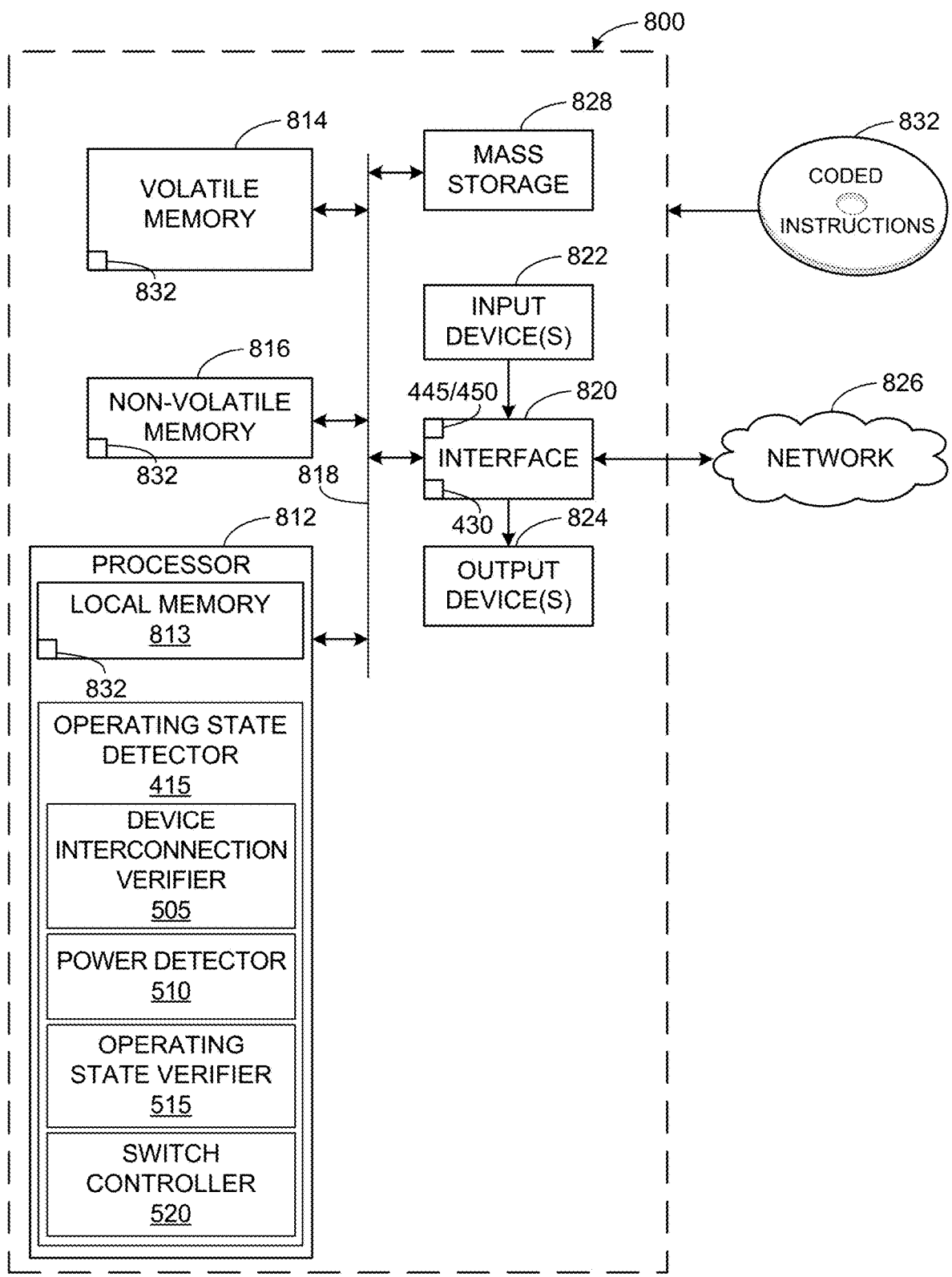
FIG. 8 is a block diagram of an example processor platform structured to execute the example machine readable instructions of FIGS. 6 and/or 7 to implement the example operating state detector of FIG. 4 and/or the example device interconnection verifier of FIG. 5.

FIG. 8 is a block diagram of an example processor platform 800 capable of executing the instructions of FIGS. 6 and/or 7 to implement the example operating state detector 415 of FIGS. 4 and/or 5. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In some examples, the example processor 812 is configured via example instructions 832, which include the example instructions of FIGS. 6 and/or 7, to implement the example device interconnection verifier 505, the example power detector 510, the example operating state verifier 515 and/or the example switch controller 520 of the example enhanced operating state detector 415 of FIGS. 4 and/or 5.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

In some examples, the interface circuit 820 is configured to implement the example TSI 430 and/or the example switches 445-450 of the example enhanced operating state detector 415 of FIGS. 4 and/or 5.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives.

Coded instructions 832 corresponding to the instructions of FIGS. 6 and/or 7 may be stored in the mass storage device 828, in the volatile memory 814, in the non-volatile memory 816, in the local memory 813 and/or on a removable tangible computer readable storage medium, such as a CD or DVD 836.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A meter to monitor a media device, the meter comprising:
   a touch sense circuit including a circuit input and a circuit output, the circuit input to electrically couple with a first power line of the meter and a capacitor, the first power line of the meter to electrically couple with a second power line of the media device, the circuit output to provide a first value based on the capacitor when the first power line of the meter is not electrically coupled with the second power line of the media device, the circuit output to provide a second value different from the first value when the first power line of the meter is electrically coupled with the second power line of the media device, the second value associated with an error indication, the first value not associated with the error indication;
   at least one memory;
   computer readable instructions; and
   at least one processor to execute the instructions to at least:
      detect the first power line of the meter is not electrically coupled with the second power line of the media device when the circuit output of the touch sense circuit provides the first value; and
      detect the first power line of the meter is electrically coupled with the second power line of the media device when the circuit output of the touch sense circuit provides the second value.

2. The meter of claim 1, further including a power detection circuit to detect whether power is present on the first power line of the meter.

3. The meter of claim 2, wherein the at least one processor is to determine the media device is powered on when power is detected on the first power line of the meter.

4. The meter of claim 2, wherein the at least one processor is to control a switch to:
   couple a battery to the first power line of the meter when power is detected on the first power line of the meter; and
   uncouple the battery from the first power line of the meter when power is not detected on the first power line of the meter, the battery to power the meter when power is not detected on the first power line of the meter.

5. A meter to monitor a media device, the meter comprising:
   a touch sense circuit including a circuit input and a circuit output, the circuit input to electrically couple with a first power line of the meter and a capacitor, the first power line of the meter to electrically couple with a second power line of the media device, the circuit output to provide a first value based on the capacitor when the first power line of the meter is not electrically coupled with the second power line of the media device, the circuit output to provide a second value different from the first value when the first power line of the meter is electrically coupled with the second power line of the media device;
   a power detection circuit to detect whether power is present on the first power line of the meter;
   at least one memory;
   computer readable instructions; and
   at least one processor to execute the instructions to at least:
      detect the first power line of the meter is not electrically coupled with the second power line of the media device when the circuit output of the touch sense circuit provides the first value;
      detect the first power line of the meter is electrically coupled with the second power line of the media device when the circuit output of the touch sense circuit provides the second value; and control a switch to couple the circuit input with the first power line of the meter when power is not detected on the first power line of the meter.

6. The meter of claim 5, wherein the at least one processor is to control the switch to uncouple the circuit input from the first power line of the meter when power is detected on the first power line of the meter.

7. At least one non-transitory computer readable medium comprising computer readable instructions that, when executed, cause at least processor to at least:
 access a circuit output of a touch sense circuit, the touch sense circuit including a circuit input to electrically couple with a first power line of a meter and a capacitor, the first power line of the meter to electrically couple with a second power line of a media device, the circuit output to provide a first value based on the capacitor when the first power line of the meter is not electrically coupled with the second power line of the media device, the circuit output to provide a second value different from the first value when the first power line of the meter is electrically coupled with the second power line of the media device, the second value associated with an error indication, the first value not associated with the error indication;
 detect the first power line of the meter is not electrically coupled with the second power line of the media device when the circuit output of the touch sense circuit provides the first value; and
 detect the first power line of the meter is electrically coupled with the second power line of the media device when the circuit output of the touch sense circuit provides the second value.

8. The at least one non-transitory computer readable medium of claim 7, wherein the instructions cause the at least one processor to detect, in combination with a power detection circuit, whether power is present on the first power line of the meter.

9. The at least one non-transitory computer readable medium of claim 8, wherein the instructions cause the at least one processor to determine the media device is powered on when power is detected on the first power line of the meter.

10. The at least one non-transitory computer readable medium of claim 8, wherein the instructions cause the at least one processor to control a switch to:
 couple a battery to the first power line of the meter when power is detected on the first power line of the meter; and
 uncouple the battery from the first power line of the meter when power is not detected on the first power line of the meter, the battery to power the meter when power is not detected on the first power line of the meter.

11. At least one non-transitory computer readable medium comprising computer readable instructions that, when executed, cause at least one processor to:
 access a circuit output of a touch sense circuit, the touch sense circuit including a circuit input to electrically couple with a first power line of a meter and a capacitor, the first power line of the meter to electrically couple with a second power line of a media device, the circuit output to provide a first value based on the capacitor when the first power line of the meter is not electrically coupled with the second power line of the media device, the circuit output to provide a second value different from the first value when the first power line of the meter is electrically coupled with the second power line of the media device;
 detect the first power line of the meter is not electrically coupled with the second power line of the media device when the circuit output of the touch sense circuit provides the first value;
 detect the first power line of the meter is electrically coupled with the second power line of the media device when the circuit output of the touch sense circuit provides the second value;
 detect, in combination with a power detection circuit, whether power is present on the first power line of the meter; and
 control a switch to couple the circuit input with the first power line of the meter when power is not detected on the first power line of the meter.

12. The at least one non-transitory computer readable medium of claim 11, wherein the instructions cause the at least one processor to control the switch to uncouple the circuit input from the first power line of the meter when power is detected on the first power line of the meter.

13. A method comprising:
 accessing a circuit output of a touch sense circuit, the touch sense circuit including a circuit input to electrically couple with a first power line of a meter and a capacitor, the first power line of the meter to electrically couple with a second power line of a media device, the circuit output to provide a first value based on the capacitor when the first power line of the meter is not electrically coupled with the second power line of the media device, the circuit output to provide a second value different from the first value when the first power line of the meter is electrically coupled with the second power line of the media device, the second value associated with an error indication, the first value not associated with the error indication;
 detecting, by executing an instruction with at least one processor, the first power line of the meter is not electrically coupled with the second power line of the media device when the circuit output of the touch sense circuit provides the first value; and
 detecting, by executing an instruction with the at least one processor, the first power line of the meter is electrically coupled with the second power line of the media device when the circuit output of the touch sense circuit provides the second value.

14. The method of claim 13, wherein further including detecting, in combination with a power detection circuit, whether power is present on the first power line of the meter.

15. The method of claim 14, further including determining the media device is powered on when power is detected on the first power line of the meter.

16. The method of claim 14, further including controlling a switch to:
 couple a battery to the first power line of the meter when power is detected on the first power line of the meter; and
 uncouple the battery from the first power line of the meter when power is not detected on the first power line of the meter, the battery to power the meter when power is not detected on the first power line of the meter.

17. A method comprising:
 accessing a circuit output of a touch sense circuit, the touch sense circuit including a circuit input to electrically couple with a first power line of a meter and a capacitor, the first power line of the meter to electrically couple with a second power line of a media device, the circuit output to provide a first value based on the capacitor when the first power line of the meter is not electrically coupled with the second power line of the media device, the circuit output to provide a second value different from the first value when the first power line of the meter is electrically coupled with the second power line of the media device;

detecting, by executing an instruction with at least one processor, the first power line of the meter is not electrically coupled with the second power line of the media device when the circuit output of the touch sense circuit provides the first value;

detecting, by executing an instruction with the at least one processor, the first power line of the meter is electrically coupled with the second power line of the media device when the circuit output of the touch sense circuit provides the second value;

detecting, in combination with a power detection circuit, whether power is present on the first power line of the meter;

controlling a switch to couple the circuit input with the first power line of the meter when power is not detected on the first power line of the meter; and controlling the switch to uncouple the circuit input from the first power line of the meter when power is detected on the first power line of the meter.

\* \* \* \* \*